United States Patent
Cheng (10) Patent No.: US 10,953,708 B2
(45) Date of Patent: Mar. 23, 2021

(54) BURNING DEVICE FOR BURNING MULTIPLE TIRE PRESSURE SENSORS AND USING METHOD THEREOF

(71) Applicant: ORANGE ELECTRONIC CO., LTD, Taichung (TW)

(72) Inventor: Lee Kuo Cheng, Taichung (TW)

(73) Assignee: Orange Electronic Co., Ltd, Taichung (TW)

( * ) Notice: Subject to any disclaimer, the term of this patent is extended or adjusted under 35 U.S.C. 154(b) by 111 days.

(21) Appl. No.: 16/374,323

(22) Filed: Apr. 3, 2019

(65) Prior Publication Data
US 2020/0156421 A1 May 21, 2020

(30) Foreign Application Priority Data
Nov. 21, 2018 (TW) .................................. 107141423

(51) Int. Cl.
| | | |
|---|---|---|
| B60C 23/04 | (2006.01) | |
| G06K 7/14 | (2006.01) | |
| H04L 29/06 | (2006.01) | |
| H04L 29/08 | (2006.01) | |

(52) U.S. Cl.
CPC ........ *B60C 23/0471* (2013.01); *G06K 7/1417* (2013.01); *H04L 67/34* (2013.01); *H04L 69/08* (2013.01)

(58) Field of Classification Search
CPC . B60C 23/0471; B60C 23/0479; H04L 69/08; H04L 67/34
See application file for complete search history.

(56) References Cited

U.S. PATENT DOCUMENTS

| | | | |
|---|---|---|---|
| 9,296,266 B1* | 3/2016 | Chen | B60C 23/0471 |
| 2009/0301601 A1* | 12/2009 | Enerson | C06D 5/06 |
| | | | 141/38 |
| 2015/0239308 A1* | 8/2015 | Yu | B60C 23/0471 |
| | | | 340/10.52 |
| 2017/0236122 A1* | 8/2017 | Kurapati | G06Q 30/02 |
| | | | 705/44 |

* cited by examiner

*Primary Examiner* — John J Lee
(74) *Attorney, Agent, or Firm* — Muncy, Geissler, Olds & Lowe, P.C.

(57) ABSTRACT

A burning device for burning multiple tire pressure sensors includes the multiple tire pressure sensors and a burning tool. Each of the multiple tire pressure sensors includes a unique identification code and a common identification code. The burning tool sends a conversion command to the multiple tire pressure sensors, so that each of the multiple tire pressure sensors is changed from a mode of the unique identification code to a mode of the common identification code. In the mode of the common identification code, a communication protocol is sent to the multiple tire pressure sensors via the burning tool, and then the communication protocol is burned into the multiple tire pressure sensors to complete a burning operation.

27 Claims, 6 Drawing Sheets

First time

Second time

Fig. 6 (PRIOR ART)

BURNING DEVICE FOR BURNING MULTIPLE TIRE PRESSURE SENSORS AND USING METHOD THEREOF

RELATED APPLICATIONS

This application claims priority to Taiwan Application Serial Number 107141423, filed Nov. 21, 2018, which is herein incorporated by reference.

BACKGROUND

Technical Field

The present disclosure relates to a burning device for burning multiple tire pressure sensors and a using method thereof. More particularly, the present disclosure relates to a burning device for burning multiple tire pressure sensors and a using method thereof which are capable of solving a problem of a conventional using method which can only burn one tire pressure sensor at one time, resulting in a cumbersome and time-consuming process of burning.

Description of Related Art

In order to protect the driving safety of a driver, the vehicles currently on the market are equipped with a tire pressure sensor and a corresponding receiving device before leaving the factory. The tire pressure sensor is used to measure the pressure and temperature of a tire to generate measurement signals, and then transmit the measurement signals to the corresponding receiving device so as to allow the driver to view the measurement signals.

Figure 6:
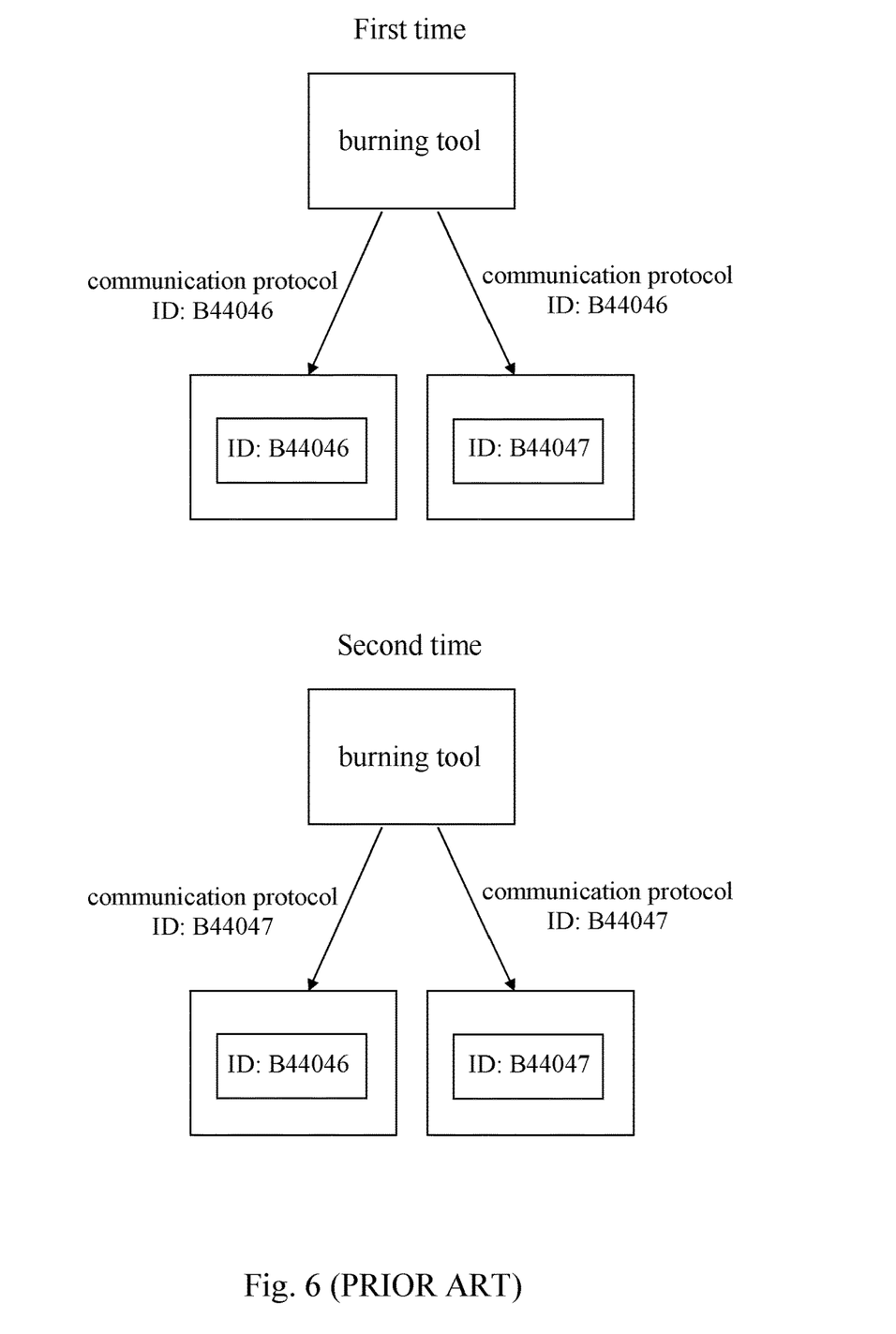
FIG. 6 shows a schematic view of a conventional using method utilizing a burning tool to burn one tire pressure sensor at one time.

The use of different and unique communication protocols to operate tire pressure sensors complicates maintenance and service operations according to a plurality of communications formats for a plurality of automobile manufacturers. When the tire pressure sensors manufactured by a non-original manufacturer are replaced, a specific communication protocol must be burned into the tire pressure sensors after installation, so that the tire pressure sensors can be communicated with the corresponding receiving device disposed in the vehicle. In general, a conventional using method utilizes a burning tool to burn one tire pressure sensor at one time, thereby resulting in a cumbersome and time-consuming process of burning the multiple tire pressure sensors. For example, a designated tire pressure sensor which needs to be burned must be placed near the burning tool and away from other non-designated tire pressure sensors so as to prevent any one of the non-designated tire pressure sensors from being burned. After the designated tire pressure sensor is burned, another tire pressure sensor must be placed near the burning tool and away from other non-designated tire pressure sensors so as to be capable of burning the another tire pressure sensor, as shown in FIG. 6. In FIG. 6, there are two designated tire pressure sensors placed near the burning tool, and the two designated tire pressure sensors need to be burned. One of the two designated tire pressure sensors has a unique identification code "B44046", and the other one of the two designated tire pressure sensors has a unique identification code "B44047". When the burning tool simultaneously transmits a communication protocol of burning to the two designated tire pressure sensors, only one of the two designated tire pressure sensors will be burned at one time. Therefore, the burning tool needs to transmit the communication protocol twice to the two designated tire pressure sensors when burning the two designated tire pressure sensors. In other words, the burning tool only burns the tire pressure sensor having the unique identification code "B44046" at first time, and the burning tool only burns the tire pressure sensor having the unique identification code "B44047" at second time, as shown in FIG. 6. If a large number of the tire pressure sensors need to be burned, the burning operation of the conventional using method takes a lot of manpower and time to burn the multiple tire pressure sensors.

According to the conventional using method, the burning tool reads identification codes of the multiple tire pressure sensors which are prepared to be burned via a wireless communication approach or an optical image. The identification (ID) codes are stored in a memory of the burning tool. Then, the ID codes stored in the memory are sequentially combined to a customized transmission protocol packet, that is, the communication protocol. The customized transmission protocol packet is received by the multiple tire pressure sensors corresponding to the identification codes via a single low-frequency transmitter module and an antenna of the wireless communication approach. Although the multiple tire pressure sensors may receive the communication protocol at the same time, the communication protocol includes the ID codes, and each of the multiple tire pressure sensors can determine itself whether a RF signal is replied to the burning tool. The conventional using method allows the burning tool to simultaneously transmit the communication protocol of burning to the multiple tire pressure sensors, but only one of the multiple tire pressure sensors transmits a reply signal to the burning tool at one time. The reply signal includes a unique ID code of the one of the multiple tire pressure sensors to complete the burning operation. The conventional using method allows the multiple tire pressure sensors collected in a fixed space to communicate with the burning tool, and sequentially completes the burning operation. A number of the multiple tire pressure sensors is 1 to N. In the conventional using method, the multiple tire pressure sensors can be placed near the burning tool, and the user can leave the burning tool. However, the communication protocol includes a unique ID code of the one of the multiple tire pressure sensors to complete the burning operation, so that after one of the multiple tire pressure sensors burns the communication protocol to complete the burning operation, another one of the multiple tire pressure sensors can burn the communication protocol. For example, when the conventional using method wants to burn two tire pressure sensors, the conventional using method utilizes the burning tool to read two unique ID codes of the two tire pressure sensors, respectively, i.e., the unique ID code A and the unique ID code B. After the burning tool selects the communication protocol which needs to be burned, the communication protocol and the unique ID code A are both transmitted to each of the two tire pressure sensors. Because only one of the two tire pressure sensors includes the unique ID code A, the one of the two tire pressure sensors including the unique ID code A performs the burning operation, and then returns the reply signal including the unique ID code A to the burning tool after completing the burning operation, so that the burning tool knows which the tire pressure sensor to be burned. Then, the communication protocol and the unique ID code B are both transmitted to each of the two tire pressure sensors by the burning tool. The other one of the two tire pressure sensors including the unique ID code B performs the burning operation. Therefore, the burning tool needs to transmit the communication protocol twice to the two tire pressure sensors. For another example, when the conventional using method wants to burn four tire pressure sensors, the burning tool needs to transmit the communication protocol four times to the four tire pressure sensors, so that the time and the cost will further increase.

SUMMARY

According to one aspect of the present disclosure, a burning device for burning multiple tire pressure sensors includes the multiple tire pressure sensors and a burning tool. Each of the multiple tire pressure sensors includes a unique identification code and a common identification code. The burning tool sends a conversion command to the multiple tire pressure sensors, so that each of the multiple tire pressure sensors is changed from a mode of the unique identification code to a mode of the common identification code. In the mode of the common identification code, a communication protocol is sent to the multiple tire pressure sensors via the burning tool, and then the communication protocol is burned into the multiple tire pressure sensors to complete a burning operation.

According to another aspect of the present disclosure, a using method of a burning device for burning multiple tire pressure sensors includes a first step, a second step and a third step. The first step is for providing the multiple tire pressure sensors, wherein each of the multiple tire pressure sensors includes a unique identification code and a common identification code. The second step is for providing a burning tool, wherein the burning tool sends a conversion command to the multiple tire pressure sensors, so that each of the multiple tire pressure sensors is changed from a mode of the unique identification code to a mode of the common identification code. The third step is for sending a communication protocol, wherein the communication protocol is sent to the multiple tire pressure sensors via the burning tool in the mode of the common identification code, and then the communication protocol is burned into the multiple tire pressure sensors to complete a burning operation.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

Figure 1:
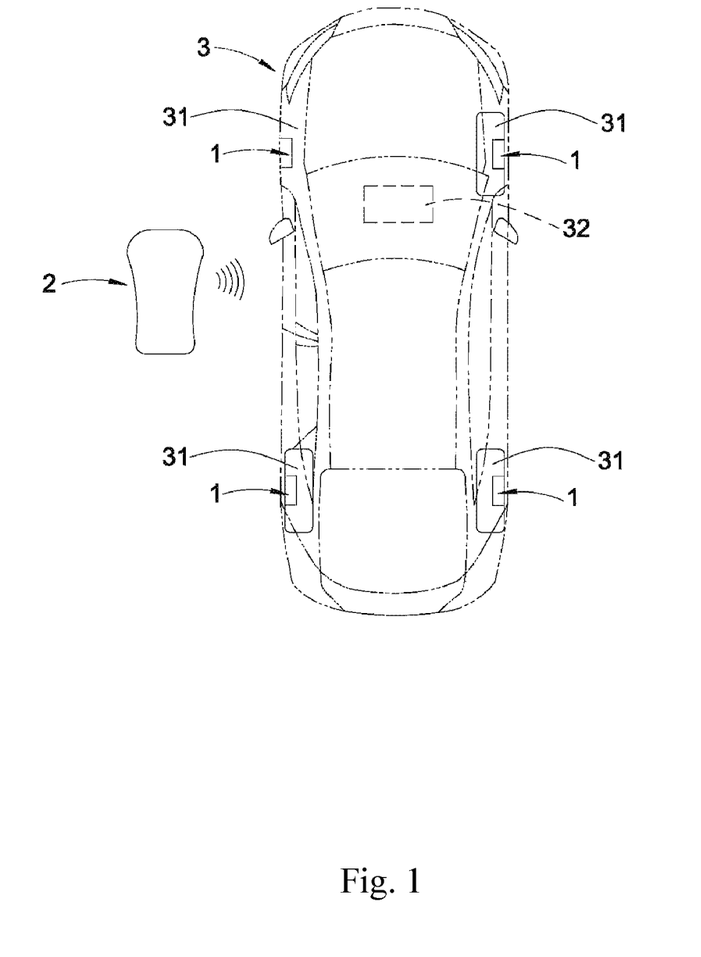
FIG. 1 shows a schematic view of an application of multiple tire pressure sensors and a burning tool according to one embodiment of the present disclosure.
Figure 2:
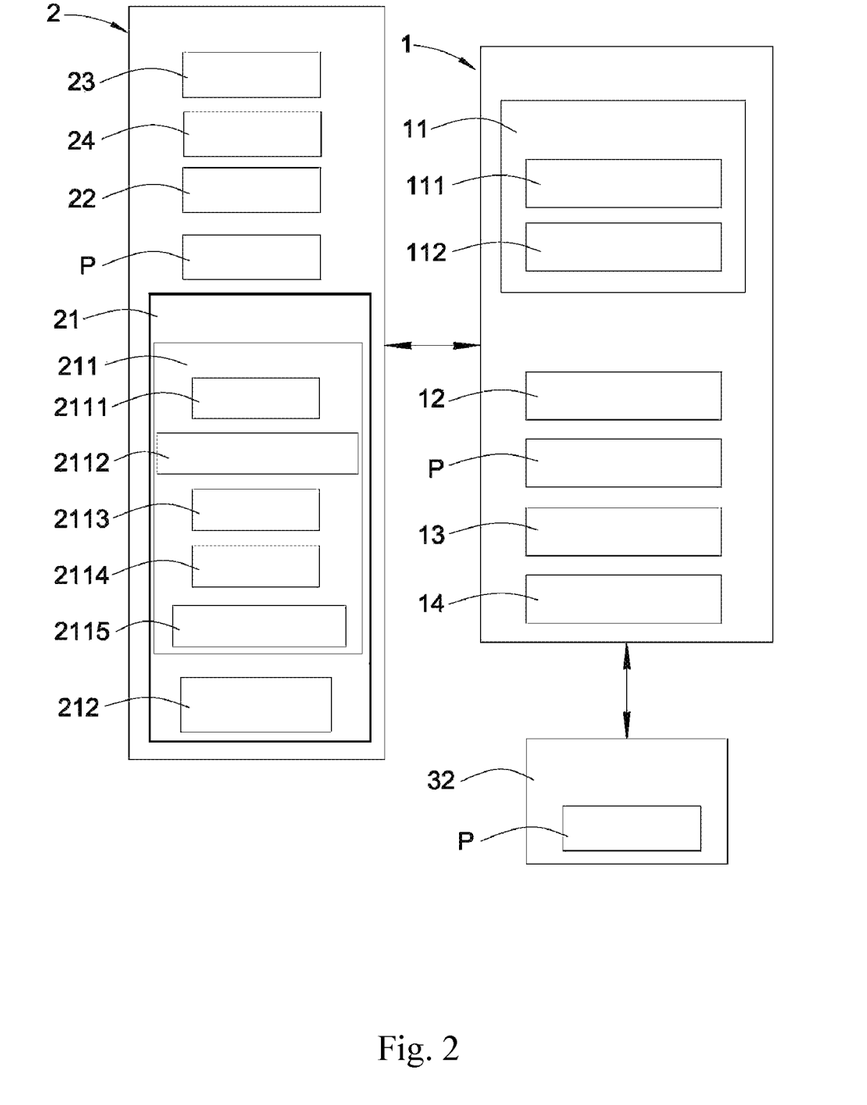
FIG. 2 shows a structural block diagram of the multiple tire pressure sensors and the burning tool of FIG. 1.
Figure 3:
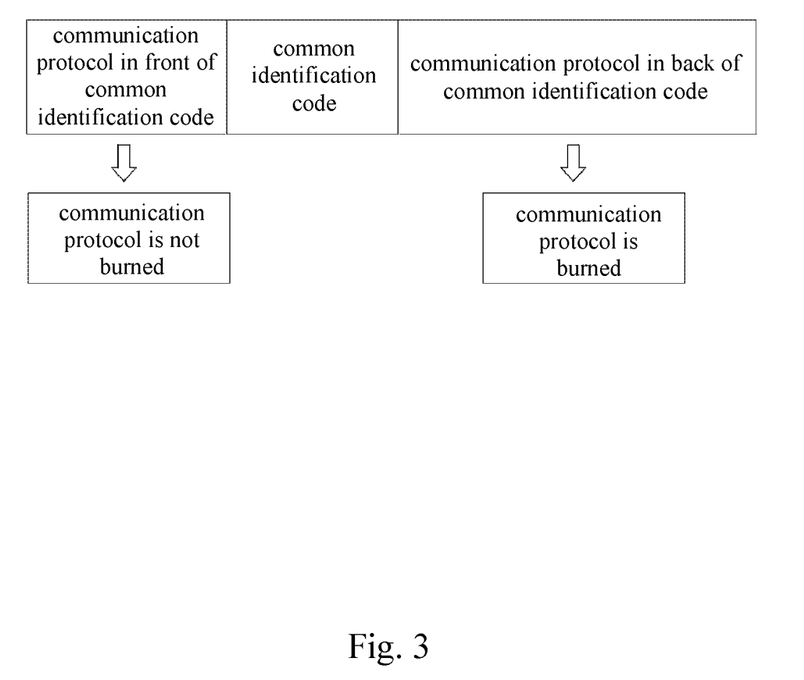
FIG. 3 shows a schematic view of a communication protocol sent to the multiple tire pressure sensors via the burning tool.
Figure 4:
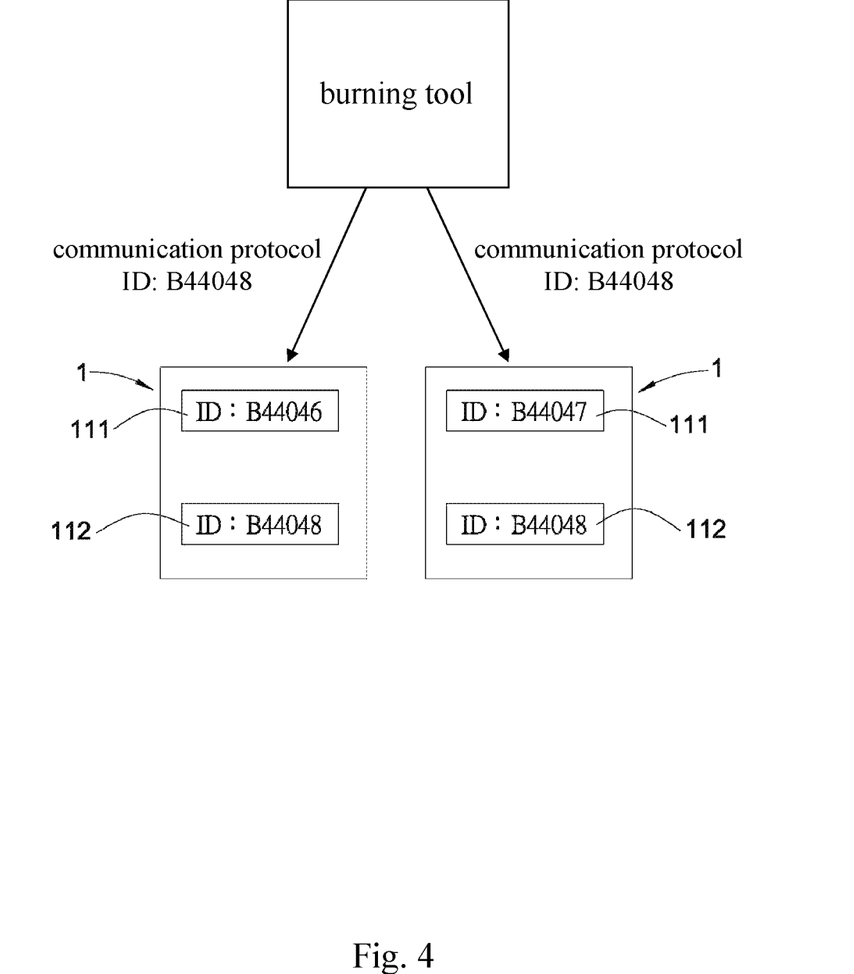
FIG. 4 shows a schematic view of a unique identification code and a common identification code of the tire pressure sensor.

FIG. 1 shows a schematic view of an application of multiple tire pressure sensors 1 and a burning tool 2 according to one embodiment of the present disclosure. FIG. 2 shows a structural block diagram of the multiple tire pressure sensors 1 and the burning tool 2 of FIG. 1. FIG. 3 shows a schematic view of a communication protocol P sent to the multiple tire pressure sensors 1 via the burning tool 2. FIG. 4 shows a schematic view of a unique identification code 111 and a common identification code 112 of the tire pressure sensor 1. A burning device for burning multiple tire pressure sensors includes the multiple tire pressure sensors 1 and the burning tool 2.

The multiple tire pressure sensors 1 are applied to a vehicle 3. The vehicle 3 has at least one tire 31. The multiple tire pressure sensors 1 are disposed on the tires 31, respectively. Each of the multiple tire pressure sensors 1 includes the unique identification code 111 and the common identification code 112. The unique identification code 111 refers to an identification code of the tire pressure sensor 1 itself, such as an identification card of the tire pressure sensor 1. The unique identification codes 111 of the multiple tire pressure sensors 1 are different from each other. The common identification codes 112 of the multiple tire pressure sensors 1 are the same as each other.

The burning tool 2 sends a conversion command 2111 to the multiple tire pressure sensors 1, so that each of the multiple tire pressure sensors 1 is changed from a mode of the unique identification code 111 to a mode of the common identification code 112. In the mode of the common identification code 112, a communication protocol P is sent to the multiple tire pressure sensors 1 via the burning tool 2, and then the communication protocol P is burned into the multiple tire pressure sensors 1 to complete a burning operation.

The mode of the unique identification code 111 represents that there is only one unique identification code 111 in each of the multiple tire pressure sensors 1, such as the identification card of the tire pressure sensor 1 used to be distinguished from other tire pressure sensors 1. The unique identification code 111 may be displayed on an outer surface of the tire pressure sensor 1 or stored in a memory of the tire pressure sensor 1. The tire pressure sensor 1 utilizes the unique identification code 111 to be distinguished from other tire pressure sensors 1, thereby being referred to as the mode of the unique identification code 111.

The mode of the common identification code 112 represents that an additional identification code is added to the tire pressure sensor 1, and the additional identification code is referred to as the common identification code 112 because the additional identification codes of a specific number of the tire pressure sensors 1 are the same. During a period when the communication protocol is not required to be burned into the tire pressure sensor 1, the tire pressure sensor 1 is in the mode of the unique identification code 111. When the communication protocol is required to be burned into the tire pressure sensor 1, the tire pressure sensor 1 utilizes the common identification code 112 to be in the mode of the common identification code 112, and then the communication protocol is burned into the tire pressure sensor 1.

Preferably, in a first embodiment, the burning tool 2 includes a transmission/reception unit 21 and an inputting unit 22, and the communication protocol P sent to the multiple tire pressure sensors 1 via the burning tool 2 has the common identification code 112. The common identification code 112 may be built in the burning tool 2, or inputted to the burning tool 2 via the inputting unit 22, or obtained after reading the multiple tire pressure sensors 1 which are burned. In addition, the common identification code 112 of the communication protocol P is the same as the common identification codes 112 of the multiple tire pressure sensors 1 which are burned. After identifying the common identification code 112, the communication protocol P in back of the common identification code 112 is burned into the tire pressure sensor 1, and the communication protocol P in front of the common identification code 112 is not burned into the tire pressure sensor 1, as shown in FIG. 3. Moreover, the communication protocol P sent to the tire pressure sensor 1 may also not have the common identification code 112 and have a chance to successfully be burned into the tire pressure sensor 1. In detail, the unique identification code 111 of one of the multiple tire pressure sensors 1 is "B44046", and the unique identification code 111 of another one of the multiple tire pressure sensors 1 is "B44047", so that the two unique identification codes 111 are different from each other, thereby being referred to as the "unique" identification code 111. The common identification codes 112 of the multiple tire pressure sensors 1 being "B44048" are the same as each other, thereby being referred to as the "common" identification code 112, as shown in FIG. 4.

Preferably, each of the multiple tire pressure sensors 1 includes a storage module 11 and a signal processing unit 12. The unique identification code 111 and the common identification code 112 of each of the multiple tire pressure sensors 1 are stored in the storage module 11. The transmission/reception unit 21 of the burning tool 2 sends the conversion command 2111 to the signal processing unit 12 of each of the multiple tire pressure sensors 1. If the multiple tire pressure sensors 1 need to remove the communication protocol P configured to communicate with a vehicle computer 32, and when one of the multiple tire pressure sensors 1 receives the conversion command 2111, the one of the multiple tire pressure sensors 1 does not enter the mode of the common identification code 112 immediately until the one of the multiple tire pressure sensors 1 removes the communication protocol configured to communicate with the vehicle computer 32, and then transmits a reply signal 13 to the transmission/reception unit 21 of the burning tool 2. The reply signal 13 is the communication protocol P configured to be communicated with the burning tool 2 so as to synchronously perform the burning operation in the multiple tire pressure sensors 1.

Preferably, in a second embodiment, the burning tool 2 includes a transmission/reception unit 21 and an inputting unit 22, and the communication protocol P sent to the multiple tire pressure sensors 1 via the burning tool 2 has the common identification code 112. The common identification code 112 may be built in the burning tool 2, or inputted to the burning tool 2 via the inputting unit 22, or obtained after reading the multiple tire pressure sensors 1 which are burned. In addition, the common identification code 112 of the communication protocol P is the same as the common identification codes 112 of the multiple tire pressure sensors 1 which are burned. After identifying the common identification code 112, the communication protocol P in back of the common identification code 112 is burned into the tire pressure sensor 1, and the communication protocol P in front of the common identification code 112 is not burned into the tire pressure sensor 1, as shown in FIG. 3. Moreover, the communication protocol P sent to the tire pressure sensor 1 may also not have the common identification code 112 and have a chance to successfully be burned into the tire pressure sensor 1. In detail, the unique identification code 111 of one of the multiple tire pressure sensors 1 is "B44046", and the unique identification code 111 of another one of the multiple tire pressure sensors 1 is "B44047", so that the two unique identification codes 111 are different from each other, thereby being referred to as the "unique" identification code 111. The common identification codes 112 of the multiple tire pressure sensors 1 being "B44048" are the same as each other, thereby being referred to as the "common" identification code 112, as shown in FIG. 4.

Preferably, each of the multiple tire pressure sensors 1 includes a storage module 11 and a signal processing unit 12. The unique identification code 111 and the common identification code 112 of each of the multiple tire pressure sensors 1 are stored in the storage module 11. The transmission/reception unit 21 of the burning tool 2 sends the conversion command 2111 to the signal processing unit 12 of each of the multiple tire pressure sensors 1. If the multiple tire pressure sensors 1 do not need to remove the communication protocol P configured to communicate with a vehicle computer 32, and when one of the multiple tire pressure sensors 1 receives the conversion command 2111, the one of the multiple tire pressure sensors 1 enters the mode of the common identification code 112, and then transmits a reply signal 13 to the transmission/reception unit 21 of the burning tool 2. The reply signal 13 is the communication protocol P configured to be communicated with the burning tool 2 so as to synchronously perform the burning operation in the multiple tire pressure sensors 1.

Preferably, in the abovementioned embodiments, the transmission/reception unit 21 of the burning tool 2 can include a transmitting module 211 and a receiving module 212. The transmitting module 211 is configured to send the conversion command 2111 to the multiple tire pressure sensors 1. The receiving module 212 is configured to receive the reply signals 13 from the multiple tire pressure sensors 1.

Preferably, in the abovementioned embodiments, when the memory of each of the multiple tire pressure sensors 1 does not have sufficient space, the burning tool 2 sends a clear memory command 2112 to a selected group of the multiple tire pressure sensors 1. The clear memory command 2112 is transmitted by the transmitting module 211. The burning tool 2 sends the clear memory command 2112 to one of the multiple tire pressure sensors 1 at one time, or the burning tool 2 sends the clear memory command 2112 to the multiple tire pressure sensors 1 at one time, thus removing the communication protocols P of the selected group of the multiple tire pressure sensors 1 configured to communicate with the vehicle computer 32. The signal processing unit 12 of each of the multiple tire pressure sensors 1 returns the communication protocol P configured to be communicated with the burning tool 2 so as to let the burning tool 2 know that the communication protocols P of the selected group of the multiple tire pressure sensors 1 configured to communicate with the vehicle computer 32 are already removed. Therefore, the memory of the multiple tire pressure sensors 1 has sufficient space for performing the burning operation after removing. When the memory of the multiple tire pressure sensors 1 configured to communicate with the vehicle computer 32 has sufficient space before removing, the burning tool 2 does not need to send the clear memory command 2112 to a selected group of the multiple tire pressure sensors 1 to remove the communication protocols P.

Moreover, the clear memory command 2112 can also be accompanied by the conversion command 2111 instead of sending the conversion command 2111 first.

In addition, the burning tool 2 sends a low-frequency signal 2114 to trigger the tire pressure sensor 1 first, and the tire pressure sensor 1 returns the communication protocol P having the unique identification code 111 to the burning tool 2. The purpose is to let the burning tool 2 know which specific tire pressure sensor 1 to be burned, and then the burning tool 2 sends the conversion command 2111. In another embodiment, the burning tool 2 can send the low-frequency signal 2114 accompanied by the conversion command 2111.

Preferably, in the abovementioned embodiments, after the burning operation, each of the multiple tire pressure sensors 1 is changed from the mode of the common identification code 112 to the mode of the unique identification code 111. The transmission/reception unit 21 of the burning tool 2 sends a check command 2113 to the multiple tire pressure sensors 1. The check command 2113 is sent by the transmitting module 211. When the signal processing unit 12 of each of the multiple tire pressure sensors 1 receives the check command 2113 from the burning tool 2, the signal processing unit 12 checks whether or not the burning operation is completed and transmits the communication protocol P having the unique identification code 111 and a reply signal 13 having a burning process to the transmission/reception unit 21 of the burning tool 2, thereby letting the burning tool 2 know whether the burning operation is successfully completed or not.

Preferably, in the abovementioned embodiments, when the burning tool 2 finds that one of the multiple tire pressure sensors 1 has an uncompleted burning operation, the transmission/reception unit 21 of the burning tool 2 sends the low-frequency signal 2114 to the one of the multiple tire pressure sensors 1 having the uncompleted burning operation. The low-frequency signal 2114 is sent by the transmitting module 211. The signal processing unit 12 of the one of the multiple tire pressure sensors 1 having the uncompleted burning operation transmits the reply signal 13 to the transmission/reception unit 21 of the burning tool 2 after receiving the low-frequency signal 2114 from the burning tool 2, and the reply signal 13 is the communication protocol P having the unique identification code 111, thereby letting the burning tool 2 know the tire pressure sensor 1 having the uncompleted burning operation and restart an individual burning operation until the burning operation is completed.

Preferably, in the abovementioned embodiments, each of the multiple tire pressure sensors 1 includes a quick response (QR) code image 14, and the QR code image 14 is corresponding to the unique identification code 111 of the storage module 11. The burning tool 2 has a scanning module 23, and the scanning module 23 scans the QR code image 14 to read the unique identification code 111.

Preferably, in the abovementioned embodiments, the burning tool 2 further includes a display unit 24 for displaying information to a user.

Figure 5:
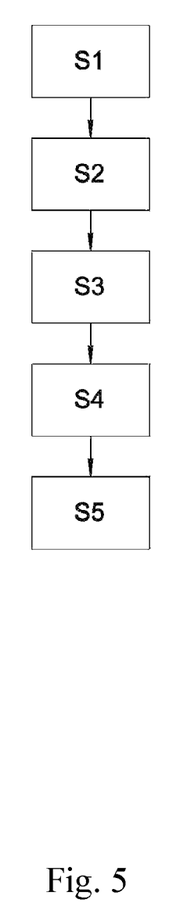
FIG. 5 shows a flow chart of a using method of a burning device according to one embodiment of the present disclosure.

FIG. 5 shows a flow chart of a using method of a burning device according to one embodiment of the present disclosure. The using method of the burning device for burning multiple tire pressure sensors 1 includes a plurality of steps S1, S2, S3.

The step S1 is for providing the multiple tire pressure sensors 1, and each of the multiple tire pressure sensors 1 includes a unique identification code 111 and a common identification code 112. The unique identification code 111 refers to an identification code of the tire pressure sensor 1 itself, such as an identification card of the tire pressure sensor 1. The unique identification codes 111 of the multiple tire pressure sensors 1 are different from each other. The common identification codes 112 of the multiple tire pressure sensors 1 are the same as each other.

The step S2 is for providing a burning tool 2, and the burning tool 2 sends a conversion command 2111 to the multiple tire pressure sensors 1, so that each of the multiple tire pressure sensors 1 is changed from a mode of the unique identification code 111 to a mode of the common identification code 112.

The step S3 is for sending a communication protocol P, and the communication protocol P is sent to the multiple tire pressure sensors 1 via the burning tool 2 in the mode of the common identification code 112, and then the communication protocol P is burned into the multiple tire pressure sensors 1 to complete a burning operation.

Preferably, in a first embodiment, the burning tool 2 includes a transmission/reception unit 21 and an inputting unit 22, and the communication protocol P sent to the multiple tire pressure sensors 1 via the burning tool 2 has the common identification code 112. The common identification code 112 may be built in the burning tool 2, or inputted to the burning tool 2 via the inputting unit 22, or obtained after reading the multiple tire pressure sensors 1 which are burned. In addition, the common identification code 112 of the communication protocol P is the same as the common identification codes 112 of the multiple tire pressure sensors 1 which are burned. After identifying the common identification code 112, the communication protocol P in back of the common identification code 112 is burned into the tire pressure sensor 1, and the communication protocol P in front of the common identification code 112 is not burned into the tire pressure sensor 1, as shown in FIG. 3. Moreover, the communication protocol P sent to the tire pressure sensor 1 may also not have the common identification code 112 and have a chance to successfully be burned into the tire pressure sensor 1. In detail, the unique identification code 111 of one of the multiple tire pressure sensors 1 is "B44046", and the unique identification code 111 of another one of the multiple tire pressure sensors 1 is "B44047", so that the two unique identification codes 111 are different from each other, thereby being referred to as the "unique" identification code 111. The common identification codes 112 of the multiple tire pressure sensors 1 being "B44048" are the same as each other, thereby being referred to as the "common" identification code 112, as shown in FIG. 4.

Preferably, each of the multiple tire pressure sensors 1 includes a storage module 11 and a signal processing unit 12. The unique identification code 111 and the common identification code 112 of each of the multiple tire pressure sensors 1 are stored in the storage module 11. The transmission/reception unit 21 of the burning tool 2 sends the conversion command 2111 to the signal processing unit 12 of each of the multiple tire pressure sensors 1. If the multiple tire pressure sensors 1 need to remove the communication protocol P configured to communicate with a vehicle computer 32, and when one of the multiple tire pressure sensors 1 receives the conversion command 2111, the one of the multiple tire pressure sensors 1 does not enter the mode of the common identification code 112 immediately until the one of the multiple tire pressure sensors 1 removes the communication protocol configured to communicate with the vehicle computer 32, and then transmits a reply signal 13 to the transmission/reception unit 21 of the burning tool 2. The reply signal 13 is the communication protocol P configured to be communicated with the burning tool 2 so as to synchronously perform the burning operation in the multiple tire pressure sensors 1.

Preferably, in a second embodiment, the burning tool 2 includes a transmission/reception unit 21 and an inputting unit 22, and the communication protocol P sent to the multiple tire pressure sensors 1 via the burning tool 2 has the common identification code 112. The common identification code 112 may be built in the burning tool 2, or inputted to the burning tool 2 via the inputting unit 22, or obtained after reading the multiple tire pressure sensors 1 which are burned. In addition, the common identification code 112 of the communication protocol P is the same as the common identification codes 112 of the multiple tire pressure sensors 1 which are burned. After identifying the common identification code 112, the communication protocol P in back of the common identification code 112 is burned into the tire pressure sensor 1, and the communication protocol P in front of the common identification code 112 is not burned into the tire pressure sensor 1, as shown in FIG. 3. Moreover, the communication protocol P sent to the tire pressure sensor 1 may also not have the common identification code 112 and have a chance to successfully be burned into the tire pressure sensor 1. In detail, the unique identification code 111 of one of the multiple tire pressure sensors 1 is "B44046", and the unique identification code 111 of another one of the multiple tire pressure sensors 1 is "B44047", so that the two unique identification codes 111 are different from each other, thereby being referred to as the "unique" identification code 111. The common identification codes 112 of the multiple tire pressure sensors 1 being "B44048" are the same as each other, thereby being referred to as the "common" identification code 112, as shown in FIG. 4.

Preferably, each of the multiple tire pressure sensors 1 includes a storage module 11 and a signal processing unit 12. The unique identification code 111 and the common identification code 112 of each of the multiple tire pressure sensors 1 are stored in the storage module 11. The transmission/reception unit 21 of the burning tool 2 sends the conversion command 2111 to the signal processing unit 12 of each of the multiple tire pressure sensors 1. If the multiple tire pressure sensors 1 do not need to remove the communication protocol P configured to communicate with a vehicle computer 32, and when one of the multiple tire pressure sensors 1 receives the conversion command 2111, the one of the multiple tire pressure sensors 1 enters the mode of the common identification code 112, and then transmits a reply signal 13 to the transmission/reception unit 21 of the burning tool 2. The reply signal 13 is the communication protocol P configured to be communicated with the burning tool 2 so as to synchronously perform the burning operation in the multiple tire pressure sensors 1.

Preferably, in the abovementioned embodiments, the transmission/reception unit 21 of the burning tool 2 can include a transmitting module 211 and a receiving module 212. The transmitting module 211 is configured to send the conversion command 2111 to the multiple tire pressure sensors 1. The receiving module 212 is configured to receive the reply signals 13 from the multiple tire pressure sensors 1.

Preferably, in the abovementioned embodiments, when the memory of each of the multiple tire pressure sensors 1 does not have sufficient space, the burning tool 2 sends a clear memory command 2112 to a selected group of the multiple tire pressure sensors 1. The clear memory command 2112 is transmitted by the transmitting module 211. The burning tool 2 sends the clear memory command 2112 to one of the multiple tire pressure sensors 1 at one time, or the burning tool 2 sends the clear memory command 2112 to the multiple tire pressure sensors 1 at one time, thus removing the communication protocols P of the selected group of the multiple tire pressure sensors 1 configured to communicate with the vehicle computer 32. The signal processing unit 12 of each of the multiple tire pressure sensors 1 returns the communication protocol P configured to be communicated with the burning tool 2 so as to let the burning tool 2 know that the communication protocols P of the selected group of the multiple tire pressure sensors 1 configured to communicate with the vehicle computer 32 are already removed. Therefore, the memory of the multiple tire pressure sensors 1 has sufficient space for performing the burning operation after removing. When the memory of the multiple tire pressure sensors 1 configured to communicate with the vehicle computer 32 has sufficient space before removing, the burning tool 2 does not need to send the clear memory command 2112 to a selected group of the multiple tire pressure sensors 1 to remove the communication protocols P.

Preferably, the using method further includes a step S4. The step S4 is for changing each of the multiple tire pressure sensors 1 from the mode of the common identification code 112 to the mode of the unique identification code 111 after the burning operation. The transmission/reception unit 21 of the burning tool 2 sends a check command 2113 to the multiple tire pressure sensors 1. The check command 2113 is sent by the transmitting module 211. When the signal processing unit 12 of each of the multiple tire pressure sensors 1 receives the check command 2113 from the burning tool 2, the signal processing unit 12 checks whether or not the burning operation is completed and transmits the communication protocol P having the unique identification code 111 and a reply signal 13 having a burning process to the transmission/reception unit 21 of the burning tool 2, thereby letting the burning tool 2 know whether the burning operation is successfully completed or not.

Preferably, in the step S4, when the burning tool 2 finds that one of the multiple tire pressure sensors 1 has an uncompleted burning operation, the transmission/reception unit 21 of the burning tool 2 sends the low-frequency signal 2114 to the one of the multiple tire pressure sensors 1 having the uncompleted burning operation. The low-frequency signal 2114 is sent by the transmitting module 211. The signal processing unit 12 of the one of the multiple tire pressure sensors 1 having the uncompleted burning operation transmits the reply signal 13 to the transmission/reception unit 21 of the burning tool 2 after receiving the low-frequency signal 2114 from the burning tool 2, and the reply signal 13 is the communication protocol P having the unique identification code 111, thereby letting the burning tool 2 know the tire pressure sensor 1 having the uncompleted burning operation and restart an individual burning operation until the burning operation is completed.

Preferably, the using method further includes a step S5. The step S5 is that when the burning operation of each of the multiple tire pressure sensors 1 is completed, the transmission/reception unit 21 of the burning tool 2 sends an exit burning command 2115 to the multiple tire pressure sensors 1. The signal processing unit 12 of each of the multiple tire pressure sensors 1 transmits the reply signal 13 to the transmission/reception unit 21 of the burning tool 2 after receiving the exit burning command 2115 from the burning tool 2, and the reply signal 13 is the communication protocol P having the unique identification code 111 of a storage module 11 so as to let the burning tool 2 know that the multiple tire pressure sensors 1 exit a burning mode.

Preferably, each of the multiple tire pressure sensors 1 includes a quick response (QR) code image 14, and the QR code image 14 is corresponding to the unique identification code 111 of the storage module 11. The burning tool 2 has a scanning module 23, and the scanning module 23 scans the QR code image 14 to read the unique identification code 111.

In addition, the burning tool 2 further includes a display unit 24 for displaying the reply signal 13 transmitted between the tire pressure sensor 1 and the burning tool 2 or other information to a user. Moreover, the user can select a number of the multiple tire pressure sensors 1 to be burned via the inputting unit 22 of the burning tool 2.

Therefore, each of the multiple tire pressure sensors 1 includes the storage module 11 and the signal processing unit 12. The unique identification code 111 and the common identification code 112 of each of the multiple tire pressure sensors 1 are stored in the storage module 11. The burning tool 2 includes the transmission/reception unit 21. The transmission/reception unit 21 of the burning tool 2 may send the conversion command 2111 to the signal processing unit 12 of each of the multiple tire pressure sensors 1, so that each of the multiple tire pressure sensors 1 is changed from the mode of the unique identification code 111 to the mode of the common identification code 112 and transmits the reply signal 13 to the transmission/reception unit 21 of the burning tool 2. The reply signal 13 is the communication protocol P configured to be communicated with the burning tool 2. Due to each of the multiple tire pressure sensors 1 changed to the mode of the common identification code 112, the communication protocol P is sent to the multiple tire pressure sensors 1 via the burning tool 2 in the mode of the common identification code 112, and then the communication protocol P is burned into the multiple tire pressure sensors 1 to complete the burning operation. Because each of the multiple tire pressure sensors 1 that needs to be burned includes the common identification code 112, the burning tool 2 only needs to transmit the communication protocol P once to the multiple tire pressure sensors 1, and the multiple tire pressure sensors 1 do not need to transmit the reply signal to the burning tool 2, so that the communication protocol P can be synchronously burned into the multiple tire pressure sensors 1. The burning tool 2 does not need to transmit the communication protocol P plural times to the multiple tire pressure sensors 1, so that the time required for burning the multiple tire pressure sensors 1 in a conventional using method is greatly saved. Accordingly, the using method of the present disclosure synchronously completes the burning operation in the multiple tire pressure sensors 1 to solve the problem of the conventional using method which can only burn one tire pressure sensor at one time, resulting in a cumbersome and time-consuming process of burning, and cannot synchronously complete the burning operation in the multiple tire pressure sensors 1.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A burning device for burning multiple tire pressure sensors, comprising:
the multiple tire pressure sensors, wherein each of the multiple tire pressure sensors comprises a unique identification code and a common identification code; and
a burning tool, wherein the burning tool sends a conversion command to the multiple tire pressure sensors, so that each of the multiple tire pressure sensors is changed from a mode of the unique identification code to a mode of the common identification code, in the mode of the common identification code, a communication protocol is sent to the multiple tire pressure sensors via the burning tool, and then the communication protocol is burned into the multiple tire pressure sensors to complete a burning operation.

2. The burning device for burning the multiple tire pressure sensors of claim 1, wherein the burning tool comprises a transmission/reception unit and an inputting unit, and the communication protocol sent to the multiple tire pressure sensors via the burning tool has the common identification code;
wherein the common identification code of the burning tool is built in the burning tool, or inputted to the burning tool via the inputting unit, or obtained after reading the multiple tire pressure sensors which are burned.

3. The burning device for burning the multiple tire pressure sensors of claim 2, wherein,
each of the multiple tire pressure sensors comprises a storage module and a signal processing unit, and the unique identification code and the common identification code of each of the multiple tire pressure sensors are stored in the storage module; and
the transmission/reception unit of the burning tool sends the conversion command to the signal processing unit of each of the multiple tire pressure sensors, if the multiple tire pressure sensors need to remove the communication protocol configured to communicate with a vehicle computer, and when one of the multiple tire pressure sensors receives the conversion command, the one of the multiple tire pressure sensors does not enter the mode of the common identification code immediately until the one of the multiple tire pressure sensors removes the communication protocol configured to communicate with the vehicle computer, and then transmits a reply signal to the transmission/reception unit of the burning tool, and the reply signal is the communication protocol configured to be communicated with the burning tool.

4. The burning device for burning the multiple tire pressure sensors of claim 3, wherein the transmission/reception unit of the burning tool comprises:
a transmitting module configured to send the conversion command to the multiple tire pressure sensors; and
a receiving module configured to receive the reply signals from the multiple tire pressure sensors.

5. The burning device for burning the multiple tire pressure sensors of claim 3, wherein when a memory of each of the multiple tire pressure sensors does not have sufficient space, the burning tool sends a clear memory command to a selected group of the multiple tire pressure sensors to remove the communication protocols of the selected group of the multiple tire pressure sensors configured to communicate with the vehicle computer, and the signal processing unit of each of the multiple tire pressure sensors returns the communication protocol configured to be communicated with the burning tool.

6. The burning device for burning the multiple tire pressure sensors of claim 3, wherein after the burning operation, each of the multiple tire pressure sensors is changed from the mode of the common identification code to the mode of the unique identification code, the transmission/reception unit of the burning tool sends a check command to the multiple tire pressure sensors, when the signal processing unit of each of the multiple tire pressure sensors receives the check command from the burning tool, the signal processing unit checks whether or not the burning operation is completed and transmits the communication protocol having the unique identification code and the reply signal having a burning process to the transmission/reception unit of the burning tool.

7. The burning device for burning the multiple tire pressure sensors of claim 6, wherein when the burning tool finds that one of the multiple tire pressure sensors has an uncompleted burning operation, the transmission/reception unit of the burning tool sends a low-frequency signal to the one of the multiple tire pressure sensors having the uncompleted burning operation, the signal processing unit of the one of the multiple tire pressure sensors having the uncompleted burning operation transmits a reply signal to the transmission/reception unit of the burning tool after receiving the low-frequency signal from the burning tool, and the reply signal is the communication protocol having the unique identification code.

8. The burning device for burning the multiple tire pressure sensors of claim 3, wherein,
   each of the multiple tire pressure sensors comprises a quick response (QR) code image, and the QR code image is corresponding to the unique identification code of the storage module; and
   the burning tool has a scanning module, and the scanning module scans the QR code image to read the unique identification code.

9. The burning device for burning the multiple tire pressure sensors of claim 2, wherein,
   each of the multiple tire pressure sensors comprises a storage module and a signal processing unit, and the unique identification code and the common identification code of each of the multiple tire pressure sensors are stored in the storage module; and
   the transmission/reception unit of the burning tool sends the conversion command to the signal processing unit of each of the multiple tire pressure sensors, if the multiple tire pressure sensors do not need to remove the communication protocol configured to communicate with a vehicle computer, and when one of the multiple tire pressure sensors receives the conversion command, the one of the multiple tire pressure sensors enters the mode of the common identification code, and then transmits a reply signal to the transmission/reception unit of the burning tool, and the reply signal is the communication protocol configured to be communicated with the burning tool.

10. The burning device for burning the multiple tire pressure sensors of claim 9, wherein the transmission/reception unit of the burning tool comprises:
    a transmitting module configured to send the conversion command to the multiple tire pressure sensors; and
    a receiving module configured to receive the reply signals from the multiple tire pressure sensors.

11. The burning device for burning the multiple tire pressure sensors of claim 9, wherein when a memory of each of the multiple tire pressure sensors does not have sufficient space, the burning tool sends a clear memory command to a selected group of the multiple tire pressure sensors to remove the communication protocols of the selected group of the multiple tire pressure sensors configured to communicate with the vehicle computer, and the signal processing unit of each of the multiple tire pressure sensors returns the communication protocol configured to be communicated with the burning tool.

12. The burning device for burning the multiple tire pressure sensors of claim 9, wherein,
    each of the multiple tire pressure sensors comprises a quick response (QR) code image, and the QR code image is corresponding to the unique identification code of the storage module; and
    the burning tool has a scanning module, and the scanning module scans the QR code image to read the unique identification code.

13. The burning device for burning the multiple tire pressure sensors of claim 2, wherein after the burning operation, each of the multiple tire pressure sensors is changed from the mode of the common identification code to the mode of the unique identification code, the transmission/reception unit of the burning tool sends a check command to the multiple tire pressure sensors, when the signal processing unit of each of the multiple tire pressure sensors receives the check command from the burning tool, the signal processing unit checks whether or not the burning operation is completed and transmits the communication protocol having the unique identification code and a reply signal having a burning process to the transmission/reception unit of the burning tool.

14. The burning device for burning the multiple tire pressure sensors of claim 13, wherein when the burning tool finds that one of the multiple tire pressure sensors has an uncompleted burning operation, the transmission/reception unit of the burning tool sends a low-frequency signal to the one of the multiple tire pressure sensors having the uncompleted burning operation, the signal processing unit of the one of the multiple tire pressure sensors having the uncompleted burning operation transmits a reply signal to the transmission/reception unit of the burning tool after receiving the low-frequency signal from the burning tool, and the reply signal is the communication protocol having the unique identification code.

15. A using method of a burning device for burning multiple tire pressure sensors, comprising:
    S1) providing the multiple tire pressure sensors, wherein each of the multiple tire pressure sensors comprises a unique identification code and a common identification code;
    S2) providing a burning tool, wherein the burning tool sends a conversion command to the multiple tire pressure sensors, so that each of the multiple tire pressure sensors is changed from a mode of the unique identification code to a mode of the common identification code; and
    S3) sending a communication protocol, wherein the communication protocol is sent to the multiple tire pressure sensors via the burning tool in the mode of the common identification code, and then the communication protocol is burned into the multiple tire pressure sensors to complete a burning operation.

16. The using method of claim 15, wherein the burning tool comprises a transmission/reception unit and an inputting unit, and the communication protocol sent to the multiple tire pressure sensors via the burning tool has the common identification code;
   wherein the common identification code is built in the burning tool, or inputted to the burning tool via the inputting unit, or obtained after reading the multiple tire pressure sensors which are burned.

17. The using method of claim 16, wherein,
   each of the multiple tire pressure sensors comprises a storage module and a signal processing unit, and the unique identification code and the common identification code of each of the multiple tire pressure sensors are stored in the storage module; and
   the transmission/reception unit of the burning tool sends the conversion command to the signal processing unit of each of the multiple tire pressure sensors, if the multiple tire pressure sensors need to remove the communication protocol configured to communicate with a vehicle computer, and when one of the multiple tire pressure sensors receives the conversion command, the one of the multiple tire pressure sensors does not enter the mode of the common identification code immediately until the one of the multiple tire pressure sensors removes the communication protocol configured to communicate with the vehicle computer, and then transmits a reply signal to the transmission/reception unit of the burning tool, and the reply signal is the communication protocol configured to be communicated with the burning tool.

18. The using method of claim 17, wherein the transmission/reception unit of the burning tool comprises:
   a transmitting module configured to send the conversion command to the multiple tire pressure sensors; and
   a receiving module configured to receive the reply signals from the multiple tire pressure sensors.

19. The using method of claim 18, wherein when a memory of each of the multiple tire pressure sensors does not have sufficient space, the burning tool sends a clear memory command to a selected group of the multiple tire pressure sensors to remove the communication protocols of the selected group of the multiple tire pressure sensors configured to communicate with the vehicle computer, and the signal processing unit of each of the multiple tire pressure sensors returns the communication protocol configured to be communicated with the burning tool.

20. The using method of claim 16, wherein,
   each of the multiple tire pressure sensors comprises a storage module and a signal processing unit, and the unique identification code and the common identification code of each of the multiple tire pressure sensors are stored in the storage module; and
   the transmission/reception unit of the burning tool sends the conversion command to the signal processing unit of each of the multiple tire pressure sensors, if the multiple tire pressure sensors do not need to remove the communication protocol configured to communicate with a vehicle computer, and when one of the multiple tire pressure sensors receives the conversion command, the one of the multiple tire pressure sensors enters the mode of the common identification code, and then transmits a reply signal to the transmission/reception unit of the burning tool, and the reply signal is the communication protocol configured to be communicated with the burning tool.

21. The using method of claim 20, wherein the transmission/reception unit of the burning tool comprises:
   a transmitting module configured to send the conversion command to the multiple tire pressure sensors; and
   a receiving module configured to receive the reply signals from the multiple tire pressure sensors.

22. The using method of claim 20, wherein when a memory of each of the multiple tire pressure sensors does not have sufficient space, the burning tool sends a clear memory command to a selected group of the multiple tire pressure sensors to remove the communication protocols of the selected group of the multiple tire pressure sensors configured to communicate with the vehicle computer, and the signal processing unit of each of the multiple tire pressure sensors returns the communication protocol configured to be communicated with the burning tool.

23. The using method of claim 15, further comprising:
   S4) changing each of the multiple tire pressure sensors from the mode of the common identification code to the mode of the unique identification code after the burning operation, wherein the transmission/reception unit of the burning tool sends a check command to the multiple tire pressure sensors, when the signal processing unit of each of the multiple tire pressure sensors receives the check command from the burning tool, the signal processing unit checks whether or not the burning operation is completed and transmits the communication protocol having the unique identification code and a reply signal having a burning process to the transmission/reception unit of the burning tool.

24. The using method of claim 23, wherein when the burning tool finds that one of the multiple tire pressure sensors has an uncompleted burning operation, the transmission/reception unit of the burning tool sends a low-frequency signal to the one of the multiple tire pressure sensors having the uncompleted burning operation, the signal processing unit of the one of the multiple tire pressure sensors having the uncompleted burning operation transmits a reply signal to the transmission/reception unit of the burning tool after receiving the low-frequency signal from the burning tool, and the reply signal is the communication protocol having the unique identification code.

25. The using method of claim 24, further comprising:
   S5) when the burning operation of each of the multiple tire pressure sensors is completed, the transmission/reception unit of the burning tool sends an exit burning command to the multiple tire pressure sensors, the signal processing unit of each of the multiple tire pressure sensors transmits the reply signal to the transmission/reception unit of the burning tool after receiving the exit burning command from the burning tool, and the reply signal is the communication protocol having the unique identification code of a storage module so as to let the burning tool know that the multiple tire pressure sensors exit a burning mode.

26. The using method of claim 23, further comprising:
   S5) when the burning operation of each of the multiple tire pressure sensors is completed, the transmission/reception unit of the burning tool sends an exit burning command to the multiple tire pressure sensors, the signal processing unit of each of the multiple tire pressure sensors transmits the reply signal to the transmission/reception unit of the burning tool after receiving the exit burning command from the burning tool, and the reply signal is the communication protocol having the unique identification code of a storage module so as to let the burning tool know that the multiple tire pressure sensors exit a burning mode.

27. The using method of claim 15, wherein, each of the multiple tire pressure sensors comprises a quick response (QR) code image, and the QR code image is corresponding to the unique identification code of a storage module of each of the multiple tire pressure sensors; and the burning tool has a scanning module, and the scanning module scans the QR code image to read the unique identification code.

* * * * *